Patented Oct. 9, 1934

1,975,998

UNITED STATES PATENT OFFICE 1,975,998

ART OF DRYING ORGANIC MATERIALS

Clarence W. Wilson, Corona, Calif., assignor to California Fruit Growers Exchange, Los Angeles, Calif., a corporation of California No Drawing. Application June 20, 1930, Serial No. 462,690

19 Claims. (Cl. 99—5)

This invention relates to certain new and useful improvements in the art of drying organic materials.

My invention relates to the art of drying organic material and liquids containing substances in solution and other solids, and in general pertains to the use of pectic acid and its salts whereby non-hygroscopic products are produced.

In drying various organic materials, and particularly in the drying of organic liquids, such as fruit and vegetable juices and liquids of animal origin, such as whey and the like, difficulties in drying are frequently encountered. As drying has been accomplished the product is frequently so hygroscopic that it is difficult to keep and handle satisfactorily.

I have discovered that by employing pectic acid or its salts as drying aids I can very largely or entirely obviate the difficulties of drying and at the same time, render the resulting product highly non-hygroscopic. As illustrative of the variety of materials which I have successfully dried by the method disclosed hereinafter, I may mention fruit juices, such as lemon juice and orange juice and liquids of animal origin, such as whey.

An object of my invention is the drying of organic materials using a drying aid.

A further object is to disclose and provide a method of drying liquids of vegetable and animal origin using pectic acid as a drying aid.

A further object is the drying of whey, using pectic acid or its salts as drying aids.

Another object is to disclose and provide a method of producing a non-hygroscopic product containing a substantial major proportion of fruit juice solids and a minor proportion of pectic acid or its salts.

Another object is to disclose and provide a non-hygroscopic product containing a substantially major proportion of whey solids and a minor proportion of pectic acid or its salts as drying aids.

These and other objects, uses and adaptations of my invention will become apparent to those skilled in the art from the following detailed description which, for purposes of illustration will be particularly directed toward the application of my invention to the drying of citrus juices and whey.

The drying aid which I employ namely,—pectic acid or its salts is characterized by the fact that when it has been dispersed in the liquid to be dried and the drying operation then carried out, it becomes substantially insoluble or non-dispersible, or at least very slowly so in either case, and for this reason is termed as being an irreversible colloid. The non-dispersible character of the dried drying aid is utilized in the process of this invention in that when the dried product is reconstituted, a desirable cloudy appearance, due to the non-dispersible drying aid, is obtained.

Pectic acid from any suitable source may be employed. Huber in Patent No. 1,410,920 discloses a method of making pectic acid, but another satisfactory method of preparation will be described in detail and may consist of the following steps:

A suitable pectin liquor, such as that obtained by an acid extraction of lemon pulp, is heated to from 25° to 50° C. It is then made just slightly alkaline with an alkaline earth hydroxide or magnesium hydroxide. To this alkaline liquor I then add about 0.5 g. per liter of sodium hydroxide previously dissolved in a small amount of water. Thorough agitation is employed, and with continued agitation the mixture passes from a dark brown to a lighter brown. Flocs begin to form which become voluminous curds. The liquid is then strained off and the residue is pressed to squeeze out most of the alkaline solution. The curds are then suspended in water. Just enough hydrochloric acid is then added to insure that the liquid is acid to litmus paper. The precipitate is collected again and carefully washed until the washings are free from all trace of hydrochloric acid. This product has been referred to by some early workers as pectice acid; however, I have some evidence that this material is actually calcium pectate.

In this connection it should be noted that certain amounts of an alkaline earth metal or magnesium must seemingly always be present in order to secure satisfactory results with the drying aids which I employ, as subsequently more fully explained.

The calcium pectate (pectate preparation) made as above described may then be dispersed in the desired quantity in water, and may be dispersed by placing it in the water and adding an alkali metal salt or ammonium salt of an acid whose calcium salt is insoluble. Oxalates, tri-basic phosphates, and carbonates are very satisfactory. The solution of the salt is added until the deposition of the insoluble calcium salt ceases. Normal temperatures may be used during this dispersion as temperature is of relatively little importance. If I have used, for example, sodium carbonate, I will have sodium pectate in solution, and calcium carbonate as a precipitate. The solution may or may not then be separated from the precipitate by suitable means, and is ready to be used.

The calcium pectate may also be dispersed by mixing it with an equal weight (on dry basis) of sodium or potassium citrate or tartrate or di-sodium or di-potassium hydrogen phosphate with water, and then heating the mixture. This is a known method of peptising substances of the nature of calcium pectate.

The solution or dispersion of the drying aid is usually employed in accordance with my invention in about 5% concentration, although this concentration may be varied considerably whenever it is convenient to do so. When the concentration exceeds about 8% the solution or dispersion of the drying aid is relatively thick and difficult to pump. When concentrations much below 5% are employed the process necessitates the evaporation of considerable quantities of water. It should be noted here that in preparing the sodium or other soluble pectate I need not make the calcium pectate precipitate as described hereinabove. However, I find it economical to do so since by this means I can remove considerable quantities of water and thus increase the concentration of the pectous material. If I start with previously prepared pectic acid I can make the sodium salt directly by using sodium hydroxide, or I can make the sodium pectate directly from the pectin liquor by making this latter alkaline with sodium hydroxide.

As a specific example of the application of my invention, I may give the following for illustrative purposes:

850 kg. of lemon juice are placed in a tank and 300 kg. of a 5% solution or dispersion of sodium pectate, prepared as described above, are rapidly stirred in. The acidity of the lemon juice acts upon the pectate complex in such a way that there is then precipitated a very weak gel whose volume is equal to and coextensive with that of the whole body of liquid. The material is then ready for drying.

This may be accomplished by means of a suitable drum drier, or other suitable drier. In my work I have found spray drying to give satisfactory results, particularly since it is a convenience for the finished product to be in a powder form, which is readily accomplished by spray drying.

At the present time I am not prepared to make a positive statement as to just what the gel referred to above is, although it is in the main composed of pectic acid. In this connection it should be noted that apparently the solubility of pectic acid in water or the like will vary according to the thoroughness of the alkaline hydrolysis at the time of its preparation, that which has been the least hydrolyzed being the most soluble and vice versa. If sodium pectate made from relatively insoluble pectic acid be placed in solution and the solution acidified, a gel will be formed throughout the solution. If, however, a more soluble pectic acid has been employed and if the solution is free from heavy metals, alkaline earths and magnesium, a gel may not form. In such case the formation of a gel may be induced by the addition of a small amount of a compound of one of the above metals to the solution. This gel is in the main composed of pectic acid. Moreover, I consider this gel to be similar to or identical with that formed in the lemon juice of the example given above, and for the sake of convenience I refer to this gel as a pectic acid gel.

It is to be noted that in general, where a heavy metal or alkaline earth metal or magnesium is necessary, the amount necessary will be greater with a more soluble pectic acid and will also be greater with a less acid solution being dried. In the example given, the calcium, if any was necessary, was present as a natural constituent of the lemon juice. In drying materials totally lacking in heavy metals, magnesium and alkaline earths, a small amount of one of these may be added if needed.

When desired the material to be dried may be concentrated to a certain extent before the addition of the drying aid.

Since lemon juice ordinarily contains about 10% of solids, the resulting product, in the example given, will be a most intimate mixture of about 85 kg. of lemon solids and about 15 kg. of the substantially non-redispersible drying aid. This product is extremely non-hygroscopic and maintains its powdered form under most atmospheric conditions.

Furthermore the pectic acid or its salts imparts non-agglomerating characteristics to the dried product, whereby the products do not form coherent, dense masses upon standing. When the product is redispersed in water or the like the lemon solids stir quickly and easily into solution, leaving substantially undispersed the drying aid, which by and during the drying operation has become relatively insoluble. Where the product is employed for beverage preparation the drying aid becomes suspended as a cloud of very fine particles and gives the beverage a pleasing and natural appearance. A cloudy citrus beverage is to be preferred to a transparent or perfectly clear beverage. Moreover, as the pectic acid does not rehydrate to any appreciable extent, it does not impart slimy or viscous characteristics to the reconstituted product.

While I have described above the drying of a specific organic material, it is to be understood that my invention is not to be limited thereto, for I am well aware that my new invention may be utilized in the drying of a variety of substances. In the example given above the relatively high acidity of the material being dried aids in causing the precipitation of the pectic acid gel. In drying materials of a lower acidity, greater amounts of an alkaline earth or magnesium must be present in order to enable a gel to form. I have even been able by using suitable amounts of calcium or the like, to dry materials that were definitely alkaline.

It is known in the art to dry fruit juices and other materials using pectin and other reversible hydrophylic colloids as drying aids, but this procedure is not nearly so satisfactory as my invention, since when only a small percentage of pectin is used the resultant product is much more hygroscopic than my new product, and if a larger percentage be employed the redispersion becomes undesirably viscous, whereas upon redispersion my new product retains a pleasing fluidity.

It is also known in the art to spray dry fruit juice using a high proportion of a material rich in dextrin, such as commercial glucose; but the product so obtained, even when kept in air tight containers, will in time settle down into a hard, brittle, almost glasslike mass; whereas under such conditions my new product will remain in powdered form indefinitely. Moreover, when my product has been exposed to the atmosphere for a considerable time, it still retains its handleability.

While I have described the preparation of a lemon powder whose solids are about 85% lemon solids, this is not to be taken as limiting, since, with the spray drier at present available to me, I have been able to make a very satisfactory product whose solids were 90% lemon solids, and I am convinced that with an improved type of drier even higher percentages of fruit solids could be obtained.

Obviously the lower limit of the concentration of fruit juice solids would be dependent largely upon choice since I can readily dry any lower concentrations, even down to the pure drying aid itself.

In drying orange juice I have obtained suitable powdered products whose solids were 90% orange juice solids, and with whey, products whose solids were about 90% whey solids.

Various other fruit and vegetable juices and fluids of organic, vegetable or animal, origin may be suitably dried employing the same process, and, as explained above, with suitable obvious variations the process may be used for drying solutions of various organic compounds.

While I have described my new invention in rather specific embodiments, it obviously is not to be limited thereto, but includes all those changes and modifications which readily suggest themselves to those skilled in the art. Having thus fully described my invention and the manner in which the same is to be produced and practiced, I claim as my invention the following.

I claim:

1. In a process of drying liquids containing organic solids in solution and suspension which would normally be hygroscopic when dried, the steps of forming a weak gel of pectic acid in the liquid to be dried, said gel being coextensive with the liquid, and then drying the gel and liquid concurrently to form a product containing solids derived from the liquid and irreversible pectic substances derived from the gel, said irreversible pectic substances forming a protecting material in the dried product whereby non-hygroscopic and non-agglomerating characteristics are imparted to the product.

2. In a process of making non-hygroscopic products from liquids containing organic substances in solution which substances would normally be hygroscopic when dried, the steps of adding a soluble salt of pectic acid to the liquid, so as to form a weak gel in said liquid, and then drying the mixture of liquid and a gel so as to form a product containing a major proportion of substances derived from the liquid, and a minor proportion of difficultly soluble and substantially non-redispersible pectic substance.

3. In the production of dry products from fruit juices, the steps of adding a soluble salt of pectic acid to fruit juices so as to form a weak gel therein, and drying the mixture, whereby the pectic acid becomes substantially non-redispersible and the resulting dried product is rendered substantially non-hygroscopic.

4. In the production of dry products from whey, the steps of adding a soluble salt of pectic acid to whey so as to form a weak gel therein, and drying the mixture, whereby the pectic acid becomes substantially non-redispersible and the resulting product is rendered substantially non-hygroscopic.

5. In a process of drying liquids containing organic solids, which solids would normally be hygroscopic when dried, the steps of forming a weak gel of pectic acid in the liquid to be dried, and then drying the mixture of liquid and the gel so as to form a product containing solids derived from the liquid and a substantially non-redispersible protecting material derived from the pectic acid, whereby non-hygroscopic and non-agglomerating characteristics are imparted to the product.

6. A substantially non-hygroscopic product comprising the dehydrated constituents of a mixture of liquid-containing organic solids which would normally be hygroscopic when dried, and pectic acid, the dry product consisting of an intimate homogeneous mixture of solids derived from the liquid and an irreversible material derived from the pectic acid.

7. In a process of making non-hygroscopic substantially dry products containing organic solids derived from a liquid, which solids would normally be hygroscopic when dried, the step of drying a mixture of a liquid containing solids in solution and suspension, a compound of an alkaline earth metal or magnesium, and a weak gel of pectic acid.

8. A substantially non-hygroscopic product comprising the dehydrated constituents of a mixture of whey and pectic acid.

9. A non-hygroscopic product comprising the dehydrated constituents of a mixture of citrus juice in major proportion and pectic acid, the dry product consisting of an intimate homogeneous mixture of solids derived from citrus juice and a minor proportion of an irreversible material derived from the pectic acid.

10. A non-hygroscopic product comprising the dehydrated constituents of a mixture of fruit juice and pectic acid, the dry product consisting of an intimate homogeneous mixture of solids derived from the fruit juice, and an irreversible material derived from the pectic acid.

11. In a process of drying liquids containing organic solids in solution and suspension which would normally be hygroscopic when dried, the steps of forming a weak gel of pectic acid in the liquid to be dried, and then drying the gel and liquid concurrently to form a product containing solids derived from the liquid and irreversible pectic substances derived from the gel, said irreversible pectic substances forming a protecting material in the dried product whereby non-hygroscopic and non-agglomerating characteristics are imparted to the product.

12. In a process of drying liquids containing organic solids, which solids would normally be hygroscopic when dried, the steps of admixing a soluble salt of pectic acid with the liquid to be dried and then drying the mixture so as to form a product containing solids derived from the liquid and a substantially non-redispersible protecting material derived from the pectic acid, whereby non-hygroscopic and non-agglomerating characteristics are imparted to the product.

13. In the process of drying acidic liquids containing organic solids in solution and suspension which would normally be hygroscopic when dried, the steps of forming a weak gel of pectic acid in the liquid to be dried, and then drying the gel and liquid concurrently to form a product containing solids derived from the liquid and irreversible pectic substances derived from the gel, said irreversible pectic substances forming a protecting material in the dried product whereby nonhygroscropic and non-agglomerating characteristics are imparted to the product.

14. In a process of drying liquids containing citrus fruit juice solids in solution and suspension, which solids would normally be hygroscopic when dried, the steps of forming a weak gel of pectic acid in the liquid to be dried and then drying the gel and liquid concurrently to form a product containing citrus fruit juice solids and irreversible pectic substances derived from the gel, said irreversible pectic substances forming a protecting material in the dried product whereby non-hygroscopic and non-agglomerating characteristics are imparted to the product.

15. A process comprising admixing a weak gel of pectic acid with lemon juice and then drying the same to produce a relatively non-hygroscopic dry product.

16. A process comprising admixing a soluble salt of pectic acid with lemon juice, and drying the same to produce a relatively non-hygroscopic dry product.

17. A substantially non-hygroscopic product comprising the dehydrated constituents of a mixture of liquid from the group of liquids consisting of fruit juices and whey, and pectic acid, the dry product consisting of an intimate homogeneous mixture of solids derived from the liquid and an irreversible material derived from the pectic acid.

18. A substantially non-hygroscopic product comprising the dehydrated constituents of a mixture of orange juice and pectic acid, the dry product consisting of an intimate homogeneous mixture of solids derived from the orange juice and an irreversible material derived from the pectic acid.

19. A substantially non-hygroscopic product comprising the dehydrated constituents of a mixture of lemon juice and pectic acid, the dry product consisting of an intimate homogeneous mixture of solids derived from the lemon juice and an irreversible material derived from the pectic acid.

CLARENCE W. WILSON.